(12) United States Patent
Chen et al.

(10) Patent No.: US 11,463,191 B2
(45) Date of Patent: Oct. 4, 2022

(54) LINK ADAPTATION FOR 5G NR

(71) Applicant: Telefonaktiebolaget LM Ericsson (PUBL), Stockholm (SE)

(72) Inventors: Xixian Chen, Ottawa (CA); Qingchao Liu, Ottawa (CA); Yashar Nezami, Ottawa (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/275,706

(22) PCT Filed: Oct. 2, 2018

(86) PCT No.: PCT/IB2018/057652
§ 371 (c)(1),
(2) Date: Mar. 12, 2021

(87) PCT Pub. No.: WO2020/070541
PCT Pub. Date: Apr. 9, 2020

(65) Prior Publication Data
US 2022/0060276 A1    Feb. 24, 2022

(51) Int. Cl.
*H04L 1/00* (2006.01)
*H04L 1/18* (2006.01)
*H04L 5/00* (2006.01)

(52) U.S. Cl.
CPC .......... *H04L 1/0005* (2013.01); *H04L 1/0011* (2013.01); *H04L 1/0026* (2013.01);
(Continued)

(58) Field of Classification Search
CPC ... H04L 1/0005; H04L 1/0006; H04L 1/0011; H04L 1/0026; H04L 1/0028; H04L 1/1867; H04L 5/0044; H04L 5/0064
See application file for complete search history.

(56) References Cited

U.S. PATENT DOCUMENTS

2013/0016694 A1    1/2013  Nimbalker et al.
2013/0343290 A1   12/2013  Ren et al.
(Continued)

FOREIGN PATENT DOCUMENTS

JP    2012134730 A    7/2012

OTHER PUBLICATIONS

PCT International Search Report issued for International application No. PCT/IB2018/057652—dated Jun. 27, 2019.
(Continued)

*Primary Examiner* — Pao Sinkantarakorn
(74) *Attorney, Agent, or Firm* — Baker Botts, LLP

(57) ABSTRACT

According to some embodiments, a method for use in a wireless transmitter of a wireless communication network comprises (1) calculating information carrying bits per resource block group (RBG) or physical resource block (PRB) based on a channel condition (e.g., signal to interference plus noise ratio (SINR)); (2) estimating the required information bits and number of RBGs based on the desired number of bits to be transmitted and the number of available RBGs; (3) determining the MCS and TBS based on the estimated information bits, the required number of RBGs, number of layers, and RBG size; (4) adjusting the MCS and TBS based on the MCS index and TBS calculated at step 3, the number of required RBGs, and the accumulated information bits calculated from step 2; and (5) determining an MCS state based on the TBS and the accumulated information bits.

23 Claims, 9 Drawing Sheets

(52) U.S. Cl.
CPC .......... *H04L 1/0028* (2013.01); *H04L 1/1867* (2013.01); *H04L 5/0044* (2013.01)

(56) References Cited

U.S. PATENT DOCUMENTS

| | | |
|---|---|---|
| 2014/0293811 A1 | 10/2014 | Rao et al. |
| 2019/0132079 A1* | 5/2019 | Saito ..................... H04L 1/0018 |
| 2020/0213032 A1* | 7/2020 | Yeo ................... H04W 72/1278 |
| 2021/0160000 A1* | 5/2021 | Fan ....................... H04L 1/0009 |

OTHER PUBLICATIONS

PCT Written Opinion of the International Searching Authority issued for International application No. PCT/IB2018/057652—dated Jun. 27, 2019.
5G White Paper by NGMN Alliance, Version 1.0; Project: NGMN 5G Initiative; Editor/Submitter: Rachid El Hattachi/Javan Erfanian—Feb. 17, 2015.
3GPP TS 38.214 v15.3.0; Technical Specification; 3rd Generation Partnership Project; Technical Specification Group Radio Access Network; NR; Physical layer procedures for data (Release 15)—Sep. 2018.
Intellectual Property India, Examination Report in India Application No. 202147019668 dated Feb. 21, 2022 (translated).

* cited by examiner

300

(from 3C)

360 - determine a number of the one or more RBGs to use for retransmission by accumulating the maximum amount of information bits per RBG until the accumulated number of information bits is greater than or equal to the TBS plus CRC bits 362 - estimate a resource element efficiency for the retransmission by comparing the TBS plus CRC bits and the determined number of RBGs for retransmission 364 - determine an MCS for the retransmission by using the table that associates an MCS index with a modulation order, a target code rate, and a spectral efficiency and selecting an MCS index associated with a spectral efficiency closest to and less than or equal to the estimated resource element efficiency 366 - determine a modulation order based on the selected MCS index 368 - retransmit the set of information bits using the determined modulation order and TBS

Fig. 3D

LINK ADAPTATION FOR 5G NR

PRIORITY

This nonprovisional application is a U.S. National Stage Filing under 35 U.S.C. § 371 of International Patent Application Serial No. PCT/IB2018/057652 filed Oct. 2, 2018 and entitled "LINK ADAPTATION FOR 5G NR" which is hereby incorporated by reference in its entirety.

TECHNICAL FIELD

Particular embodiments are directed to wireless communications and, more particularly, to performing link adaptation for Third Generation Partnership Project (3GPP) fifth generation (5G) new radio (NR).

INTRODUCTION

Link adaptation (LA) is an important radio resource management (RRM) function in wireless communication systems for reliable communication. In a typical system that uses hybrid automatic repeat request (HARQ), a purpose of link adaptation is to determine an appropriate level of error correction coding to apply to achieve a targeted operating point (e.g., a block error rate (BLER)) with a maximum possible bit rate.) Link adaptation uses information about the communication link quality. A wireless transmitter may obtain the information from measurements or via reporting of channel state information (CSI) from receiver to transmitter. To achieve high throughput, link adaptation may be performed in every transmission time interval (TTI).

In Third Generation Partnership Project (3GPP) long term evolution (LTE), the modulation and coding schemes are selected jointly. The scheduler and link adaptation work together to determine the number of scheduling blocks (SBs) to allocate and the modulation and coding scheme (MCS) to use based on an estimate of the prevailing link quality and the amount of data to be transmitted in a given TTI.

The process can be complex and time consuming because the corresponding transport block size (TBS) is selected through a large, two-dimensional (e.g., size 27*100) TBS table, such as defined in 3GPP TS 36.213 V11.4.0 Physical Layer Procedures. Multiple TBS tables are required for different modulation modes and number of layers per codeword, respectively. Wireless transmitters, such as user equipment (UEs) or base stations such as eNBs and gNBs, require large memories to save the tables. Using the same approach in NR would result in significantly larger table sizes and memory requirements because the number of physical resource blocks (PRBs) in NR is much higher than LTE.

To reduce the complexity, 3GPP 5G NR standards may not include the large TBS tables. Instead, smaller MCS and TBS tables (see below) may be first used to select an MCS index, such as in 3GPP 38214-f00 Physical Layer Procedures for Data. If the higher layer parameter MCS-Table-PDSCH is not set to '256QAM', the UE shall use $I_{MCS}$ and Table 5.1.3.1-1 (referred to herein as Table 1) to determine the modulation order (Qm) and target code rate (R) used in the physical downlink shared channel Otherwise, the UE shall use $I_{MCS}$ and Table 5.1.3.1-2 (referred to herein as Table 2) to determine the modulation order (Qm) and target code rate (R) used in the physical downlink shared channel

TABLE 5.1.3.1-1

MCS index table 1 for PDSCH

| MCS Index $I_{MCS}$ | Modulation Order $Q_m$ | Target code Rate × [1024] R | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 5.1.3.1-2

MCS index table 2 for PDSCH

| MCS Index $I_{MCS}$ | Modulation Order $Q_m$ | Target code Rate × [1024] R | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |

TABLE 5.1.3.1-2-continued

MCS index table 2 for PDSCH

| MCS Index $I_{MCS}$ | Modulation Order $Q_m$ | Target code Rate × [1024] R | Spectral efficiency |
|---|---|---|---|
| 30 | 6 | reserved | |
| 31 | 8 | reserved | |

Comparison of the two tables above with the LTE table in TS36.213 Table 7.1.7.1-1, indicates that instead of linking a MCS index to a row of PRB based transport block sizes, the MCS index simply associates to a modulation order and the desired coding rate R. Same as for LTE, MCS indexes from 29 to 31 in Table 1 or 28 to 31 in table 2, which only contain modulation order information, are used for re-transmission of the most recently transmitted TBS. The spectral efficiency, also referred to as resource element (RE) efficiency, specified in the above two tables equals modulation order times coding rate.

A UE uses an MCS index and Table 1 or 2 to determine the modulation order and coding rate for the physical downlink shared channel (PDSCH). Transport block size determination by the UE for PDSCH is specified in 38.214 section 5.1.3.2 and includes the following steps.

At a first step, a UE determines the number of resource elements allocated for PDSCH within a PRB ($N'_{RE}$) by $N'_{RE} = N_{sc}^{RB} * N_{symb}^{sh} - N_{DMRS}^{PRB} - N_{oh}^{PRB}$, where $N_{sc}^{RB} = 12$ (number of subcarriers in a PRB) and $N_{symb}^{slot}$ is the number of scheduled orthogonal frequency division multiplexing (OFDM) symbols in a slot. At a second step, the UE quantizes $N'_{RE}$ to $\bar{N}'_{RE}$ according to table 5.1.3.2-1. The quantized set is {6, 12, 18, 42, 72, 108, 144, 156} resource elements per resource block (REs/RB). The UE then determines the total number of REs allocated for PDSCH ($N_{RE}$) as $N_{RE} = \bar{N}'_{RE} * n_{PRB}$ where $n_{PRB}$ is the total number of allocated PRBs for the UE. At a third step, the UE obtains an intermediate number of information bits $N_{info} = N_{RE} * R * Q_m * \upsilon$. R (target code rate) and Qm (modulation order) are derived from the MCS based on the applicable 3GPP table for the highest modulation order of 64QAM (Table 5.1.3.1-1) or 256QAM (Table 5.1.3.1-2). Which MCS table the UE uses is configured by the radio resource control (RRC) parameter mcs-Table. At a fourth step, the UE quantizes the intermediate information bits to transport block size according to section 5.1.3.2 of 3GPP 38214-f00 Physical Layer Procedures for Data.

SUMMARY

The embodiments described herein include new modulation and coding scheme (MCS) and transport block size (TBS) selection algorithms for Third Generation Partnership Project (3GPP) fifth generation (5G) new radio (NR). For a new transmission, a selection algorithm generally includes the following steps. A wireless transmitter (e.g., eNB, gNB, etc.) (1) calculates information carrying bits per resource block group (RBG) or physical resource block (PRB) based on a channel condition (e.g., signal to interference plus noise ratio (SINR)); (2) estimates the required information bits and number of RBGs based on the desired number of bits to be transmitted and the number of available RBGs; (3) determines the MCS and TBS based on the estimated information bits, the required number of RBGs, number of layers, and RBG size; (4) adjusts the MCS and TBS based on the MCS index and TBS calculated at step 3, the number of required RBGs, and the accumulated information bits calculated from step 2; and (5) determines an MCS state based on the TBS and the accumulated information bits. A similar process may be used for re-transmission.

According to some embodiments, a method for use in a wireless transmitter (e.g., eNB, gNB) of a wireless communication network comprises obtaining a set of information bits to be transmitted wirelessly using one or more radio RBGs. The number of bits in the set of information bits is referred to as the desired number of bits. The method further comprises: determining a modulation type for the wireless transmission that maximizes an amount of information bits per RBG based on a channel quality associated with the one or more RBGs and the modulation type; estimating a total number of bits for transmission based on the desired number of bits, a number of cyclic redundancy check (CRC) bits, and a number of padding bits; determining a number of the one or more RBGs to use for transmission by accumulating the maximum amount of information bits per RBG until the accumulated number of information bits is greater than or equal to the estimated total number of bits for transmission; estimating a resource element efficiency by comparing the estimated total number of bits for transmission and the determined number of RBGs for transmission; determining an MCS by using a table that associates an MCS index with a modulation order, a target code rate, and a spectral efficiency and selecting an MCS index associated with a spectral efficiency closest to and less than or equal to the estimated resource element efficiency; calculating a TBS using the selected MCS index and associated modulation order and target code rate; adjusting the value of the calculated TBS based on a difference between the calculated TBS and the desired number of bits; and transmitting the set of information bits using the adjusted TBS.

In particular embodiments, adjusting the value of the calculated TBS comprises determining the desired number of bits is less than or equal to the accumulated number of information bits minus CRC bits and determining whether the calculated TBS is less than or greater than the desired number of bits. Upon determining the calculated TBS is less than the desired number of bits, the method comprises increasing the MCS index until an associated TBS is greater than or equal to the desired number of bits. Upon determining the calculated TBS is greater than desired number of bits, the method comprises decreasing the MCS index until an associated TBS reaches the smallest value that is greater than or equal to the desired number of bits.

In particular embodiments, adjusting the value of the calculated TBS comprises determining the desired number of bits is less than or equal to the accumulated number of information bits minus CRC bits; determining the calculated TBS is less than desired number of bits; increasing the number of RBGs to use for transmission; and estimating the resource element efficiency, determining the MCS, and calculating the TBS using the increased number of RBGs.

In particular embodiments, adjusting the value of the calculated TBS comprises determining the total number of bits for transmission is greater than the accumulated number of information bits minus the CRC bits and determining whether the calculated TBS is less than or greater than the accumulated number of information bits minus the CRC bits. Upon determining the calculated TBS is less than the accumulated number of information bits minus the CRC bits, the method comprises increasing the MCS index until an associated TBS is greater than or equal to the accumulated number of information bits minus the CRC bits. Upon determining the calculated TBS is greater than the accumulated number of information bits minus the CRC bits, the method comprises decreasing the MCS index until an associated TBS reaches the smallest value that is greater than or equal to the accumulated number of information bits minus the CRC bits.

In particular embodiments, the method further comprises determining that the adjusted TBS is between a minimum threshold size and a maximum threshold size. The method may further comprise: determining that the selected MCS index is higher than can be supported by the channel quality associated with the one or more RBGs; receiving a negative acknowledgement (NACK) for the transmitted set of information bits; and adjusting an outer loop link adaptation parameter based on the determination that the selected MCS index is higher than the channel quality can support. In some embodiments, the method further comprises: determining that the selected MCS index is lower than can be supported by the channel quality associated with the one or more RBGs; receiving a positive acknowledgement (ACK) for the transmitted set of information bits; and adjusting an outer loop link adaptation parameter based on the determination that the selected MCS index is lower than the channel quality can support.

In particular embodiments, the method further comprises determining that the selected MCS index is too high for the channel quality associated with the one or more RBGs and not transmitting the set of information bits.

Particular embodiments include retransmissions. For example, the method may further comprise receiving a NACK for the transmitted set of information bits; determining a modulation type for a wireless retransmission that maximizes an amount of information bits per RBG based on a channel quality associated with the one or more RBGs and the modulation type; determining a number of the one or more RBGs to use for retransmission by accumulating the maximum amount of information bits per RBG until the accumulated number of information bits is greater than or equal to the TBS plus CRC bits; estimating a resource element efficiency for the retransmission by comparing the TBS plus CRC bits and the determined number of RBGs for retransmission; determining an MCS for the retransmission by using the table that associates an MCS index with a modulation order, a target code rate, and a spectral efficiency and selecting an MCS index associated with a spectral efficiency closest to and less than or equal to the estimated resource element efficiency; determining a modulation order based on the selected MCS index; and retransmitting the set of information bits using the determined modulation order and TBS.

According to some embodiments, a wireless transmitter (e.g., eNB, gNB) of a wireless communication network comprises processing circuitry operable to: obtain a set of information bits for wireless transmission using one or more RBGs; determine a modulation type for the wireless transmission that maximizes an amount of information bits per RBG based on a channel quality associated with the one or more RBGs and the modulation type; estimate a total number of bits for transmission based on the desired number of bits, a number of CRC bits, and a number of padding bits; determine a number of the one or more RBGs to use for transmission by accumulating the maximum amount of information bits per RBG until the accumulated number of information bits is greater than or equal to the estimated total number of bits for transmission; estimate a resource element efficiency by comparing the total number of bits for transmission and the determined number of RBGs for transmission; determine an MCS by using a table that associates an MCS index with a modulation order, a target code rate, and a spectral efficiency and selecting an MCS index associated with a spectral efficiency closest to and less than or equal to the estimated resource element efficiency; calculate a TBS using the selected MCS index and associated modulation order and target code rate; adjust the value of the calculated TBS based on a difference between the calculated TBS and the desired number of bits; and transmit the set of information bits using the adjusted TBS.

In particular embodiments, to adjust the value of the calculated TBS, the processing circuitry is operable to determine the total number of bits for transmission is less than or equal to the accumulated number of information bits minus CRC bits and determine whether the calculated TBS is less than or greater than the desired number of bits. Upon determining the calculated TBS is less than the desired number of bits, the processing circuitry is operable to increase the MCS index until an associated TBS is greater than or equal to desired number of bits. Upon determining the calculated TBS is greater than the desired number of bits, the processing circuitry is operable to decrease the MCS index until an associated TBS reaches the smallest value that is greater than or equal to the desired number of bits.

In particular embodiments, to adjust the value of the calculated TBS, the processing circuitry is operable to: determine the total number of bits for transmission is less than or equal to the accumulated number of information bits minus CRC bits; determine the calculated TBS is less than the desired number of bits; increase the number of RBGs to use for transmission; and estimate the resource element efficiency, determine the MCS, and calculate the TBS using the increased number of RBGs.

In particular embodiments, to adjust the value of the calculated TBS, the processing circuitry is operable to determine the desired number of bits is greater than the accumulated number of information bits minus the CRC bits and determine whether the calculated TBS is less than or greater than the accumulated number of information bits minus the CRC bits. Upon determining the calculated TBS is less than the accumulated number of information bits minus the CRC bits, the processing circuitry is operable to increase the MCS index until an associated TBS is greater than or equal to the accumulated number of information bits minus the CRC bits. Upon determining the calculated TBS is greater than the accumulated number of information bits minus the CRC bits, the processing circuitry is operable to decrease the MCS index until an associated TBS reaches the smallest value that is greater than or equal to the accumulated number of information bits minus the CRC bits.

In particular embodiments, the processing circuitry further operable to determine that the adjusted TBS is between a minimum threshold size and a maximum threshold size. The processing circuitry may be further operable to: determine that the selected MCS index is higher than can be supported by the channel quality associated with the one or more RBGs; receive a NACK for the transmitted set of information bits; and adjust an outer loop link adaptation parameter based on the determination that the selected MCS index is higher than the channel quality can support. The processing circuitry may be further operable to: determine that the selected MCS index is lower than can be supported by the channel quality associated with the one or more RBGs; receive an ACK for the transmitted set of information bits; and adjust an outer loop link adaptation parameter based on the determination that the selected MCS index is lower than the channel quality can support.

In particular embodiments, the processing circuitry further operable to determine that the selected MCS index is too high for the channel quality associated with the one or more RBGs and not transmit the set of information bits.

In particular embodiments, the processing circuitry further operable to: receive a NACK for the transmitted set of information bits; determine a modulation type for a wireless retransmission that maximizes an amount of information bits per RBG based on a channel quality associated with the one or more RBGs and the modulation type; determine a number of the one or more RBGs to use for retransmission by accumulating the maximum amount of information bits per RBG until the accumulated number of information bits is greater than or equal to the TBS plus CRC bits; estimate a resource element efficiency for the retransmission by comparing the TBS plus CRC bits and the determined number of RBGs for retransmission; determine an MCS for the retransmission by using the table that associates an MCS index with a modulation order, a target code rate, and a spectral efficiency and selecting an MCS index associated with a spectral efficiency closest to and less than or equal to the estimated resource element efficiency; determine a modulation order based on the selected MCS index; and retransmit the set of information bits using the determined modulation order and TBS.

In particular embodiments, the wireless transmitter comprises a network node (e.g., eNB, gNB, etc.) or a wireless device (e.g., UE).

According to some embodiments, a wireless transmitter of a wireless communication network comprises an obtaining module, a determining module, and a transmitting module. The obtaining module is operable to obtain a set of information bits for wireless transmission using one or more RBGs. The determining module is operable to: determine a modulation type for the wireless transmission that maximizes an amount of information bits per RBG based on a channel quality associated with the one or more RBGs and the modulation type; estimate a total number of bits for transmission based on the desired number of bits, a number of CRC bits, and a number of padding bits; determine a number of the one or more RBGs to use for transmission by accumulating the maximum amount of information bits per RBG until the accumulated number of information bits is greater than or equal to the estimated total number of bits for transmission; estimate a resource element efficiency by comparing the estimated total number of bits for transmission and the determined number of RBGs for transmission; determine an MCS by using a table that associates an MCS index with a modulation order, a target code rate, and a spectral efficiency and selecting an MCS index associated with a spectral efficiency closest to and less than or equal to the estimated resource element efficiency; calculate a TBS using the selected MCS index and associated modulation order and target code rate; and adjust the value of the calculated TBS based on a difference between the calculated TBS and the desired number of bits. The transmitting module is operable to transmit the set of information bits using the adjusted TBS.

Also disclosed is a computer program product. The computer program product comprises instructions stored on non-transient computer-readable media which, when executed by a processor, perform the steps of obtaining a set of information bits to be transmitted wirelessly using one or more radio RBGs; determining a modulation type for the wireless transmission that maximizes an amount of information bits per RBG based on a channel quality associated with the one or more RBGs and the modulation type; estimating a total number of bits for transmission based on the desired number of bits, a number of CRC bits, and a number of padding bits; determining a number of the one or more RBGs to use for transmission by accumulating the maximum amount of information bits per RBG until the accumulated number of information bits is greater than or equal to the estimated total number of bits for transmission; estimating a resource element efficiency by comparing the estimated total number of bits for transmission and the determined number of RBGs for transmission; determining an MCS by using a table that associates an MCS index with a modulation order, a target code rate, and a spectral efficiency and selecting an MCS index associated with a spectral efficiency closest to and less than or equal to the estimated resource element efficiency; calculating a TBS using the selected MCS index and associated modulation order and target code rate; adjusting the value of the calculated TBS based on a difference between the calculated TBS and the desired number of bits; and transmitting the set of information bits using the adjusted TBS.

Particular embodiments may include some, all, or none of the following advantages. Some embodiments simplify calculation of the number of information carrying bits per RBG. Some embodiments simplify calculation of the estimated information bits and the required allocation resources. Particular embodiments include a fast search algorithm for calculating MCS and TBS. Additionally, the MCS and TBS adjustment algorithm improves the accuracy of the calculation and improves performance. The MCS state calculation may be simplified. Particular embodiments include a simple formula to determine whether a re-transmission will be successful. Particular embodiments remove the large memory requirements associated with using LTE-like tables. Some embodiments may include additional or other advantages.

BRIEF DESCRIPTION OF THE DRAWINGS

For a more complete understanding of the embodiments and their features and advantages, reference is now made to the following description, taken in conjunction with the accompanying drawings, in which:

FIGS. 3A-3E are a flow diagram illustrating an example method in a wireless transmitter, according to particular embodiments;

DETAILED DESCRIPTION

Figure 1:
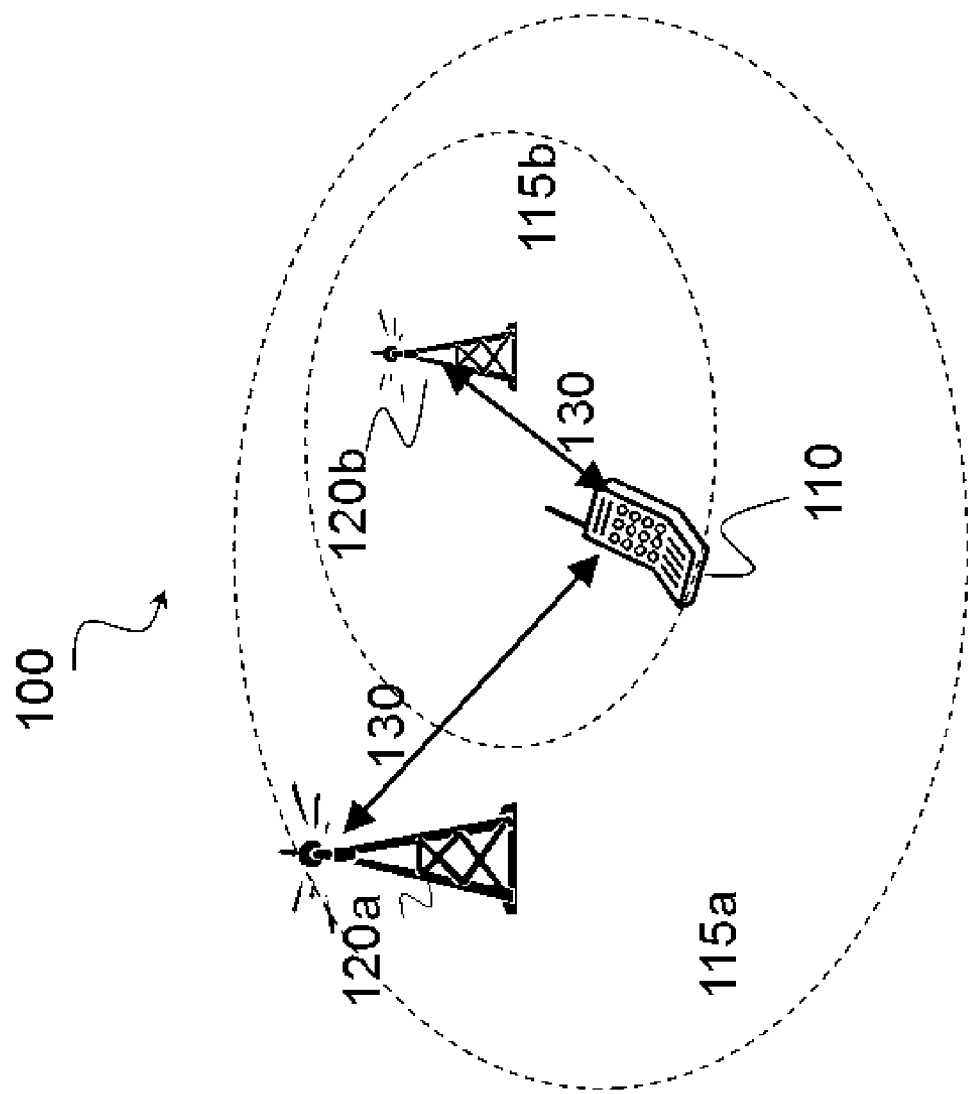
FIG. 1 is a block diagram illustrating an example wireless network, according to a particular embodiment.

Link adaptation (LA) uses information about the communication link quality to achieve high throughput. In Third Generation Partnership Project (3GPP) long term evolution (LTE), the modulation and coding schemes are selected jointly. The scheduler and link adaptation work together to determine the number of scheduling blocks (SBs) to allocate and the modulation and coding scheme (MCS) to use based on an estimate of the prevailing link quality and the amount of data to be transmitted in a given transmission time interval (TTI).

The process can be complex and time consuming because the corresponding transport block size (TBS) is selected through a large, two-dimensional TBS table. Multiple TBS tables are required for different modulation modes and number of layers per codeword, respectively. Using the same approach in 3GPP fifth generation (5G) new radio (NR) would result in significantly larger table sizes and memory requirements because the number of physical resource blocks (PRBs) in NR is much higher than LTE.

To reduce the complexity, 5G NR standards may include smaller MCS and TBS tables that are used to select an MCS index. A wireless transmitter may use tables to determine the modulation order (Qm) and target code rate (R) used in the physical downlink shared channel (PDSCH).

The MCS index associates to a modulation order and the desired coding rate R. A wireless transmitter uses an MCS index and a table to determine the modulation order and coding rate for the PDSCH. A problem with existing solutions is that the time slot unit for scheduling with 5G NR is much smaller than the time slot for LTE (can be down to 1/16), and thus minimizing scheduling process time is critical for a gNB, for example.

Because 5G does not include a TBS table for MCS and TBS selection, the algorithms developed for LTE standards cannot be directly applied to 5G. Particular embodiments, using the 5G tables, include efficient selection of MCS and TBS for either new transmission or re-transmission based on an estimate of the prevailing link quality and the amount of data to be transmitted in a given slot as well as the number of resources (e.g., resource block groups (RBGs)) available for allocation.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-5B of the drawings, like numerals being used for like and corresponding parts of the various drawings. LTE and NR are used throughout this disclosure as an example cellular system, but the ideas presented herein may apply to other wireless communication systems as well.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations, eNodeBs, gNBs, etc.). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Wireless signal 130 may comprise one or more beams. Particular beams may be beamformed in a particular direction. Each wireless device 110 may have a single receiver or multiple receivers for receiving signals 130 from network nodes 120 or other wireless devices 110. Wireless device 110 may receive one or more beams comprising wireless signal 130.

A wireless transmitter, such as network node 120, may perform link adaptation. The wireless transmitter may determine a MCS and TBS for transmission based on link quality.

In particular embodiments, network node 120 may obtain a set of information bits for wireless transmission using one or more RBGs. The number of bits in the set of information bits may be referred to as the desired number of bits.

Network node 120 may determine a modulation type for the wireless transmission that maximizes an amount of information bits per RBG based on a channel quality associated with the one or more RBGs and the modulation type. Network node 120 may estimate a total number of bits for transmission based on the desired number of bits, a number of CRC bits, and a number of padding bits. To determine a number of the one or more RBGs to use for transmission, network node 120 may accumulate the maximum amount of information bits per RBG until the accumulated number of information bits is greater than or equal to the estimated total number of bits for transmission.

Network node 120 may estimate a resource element efficiency by comparing the total number of bits for transmission and the determined number of RBGs for transmission. Determining an MCS is performed using a table that associates an MCS index with a modulation order, a target code rate, and a spectral efficiency and selecting an MCS index associated with a spectral efficiency closest to and less than or equal to the estimated resource element efficiency.

Network node 120 calculates a TBS using the selected MCS index and associated modulation order and target code rate. To optimize the results, network node 120 may adjust the value of the calculated TBS based on a difference between the calculated TBS and the desired number of bits. Network node 120 transmits the set of information bits to wireless device 110 using the adjusted TBS. Additional examples are described in more detail below and with respect to FIGS. 3A-5B.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 4A below. Similarly, a network node may include any suitable combination of hardware and/or software. For example, in particular embodiments, a network node, such as network node 120, may include the components described with respect to FIG. 5A below. While some of the examples described herein use downlink transmission, the embodiments described herein apply to uplink transmission as well.

Particular embodiments include MCS and TBS selection for a new transmission. In some embodiments, a wireless transmitter determines the MCS index, TB size, the code rate, and the number of resources (e.g., number of RBGs (resource block groups)) to be allocated based on an estimate of the prevailing link quality and the amount of data which is desired to be transmitted in a given slot.

Particular embodiments calculate information carrying bits per RBG. Without losing generality, particular examples assume that the resources are allocated in units of RBGs. The concept of RBG may be specified in the standards or may be product specific. For example, an RBG may be defined with its size equal 1, which contains only one PRB.

Particular embodiments calculate how many information bits an RBG can carry based on its channel quality. Some embodiments may assume each RE (resource element) in a RBG[i] has the same SINR[i] value for i=1, 2, . . . , N, and that the entire bandwidth includes N RBGs. SINR[i] may be computed by combining the UE's channel state information (CSI) reports and gNB's outer-loop adjustments. In one example, a wireless transmitter such as a gNB may obtain a value for the number of layers supported by the wireless transmitter from the UE's CSI info, nrofLayers. The gNB may override the value if needed.

Figure 2:
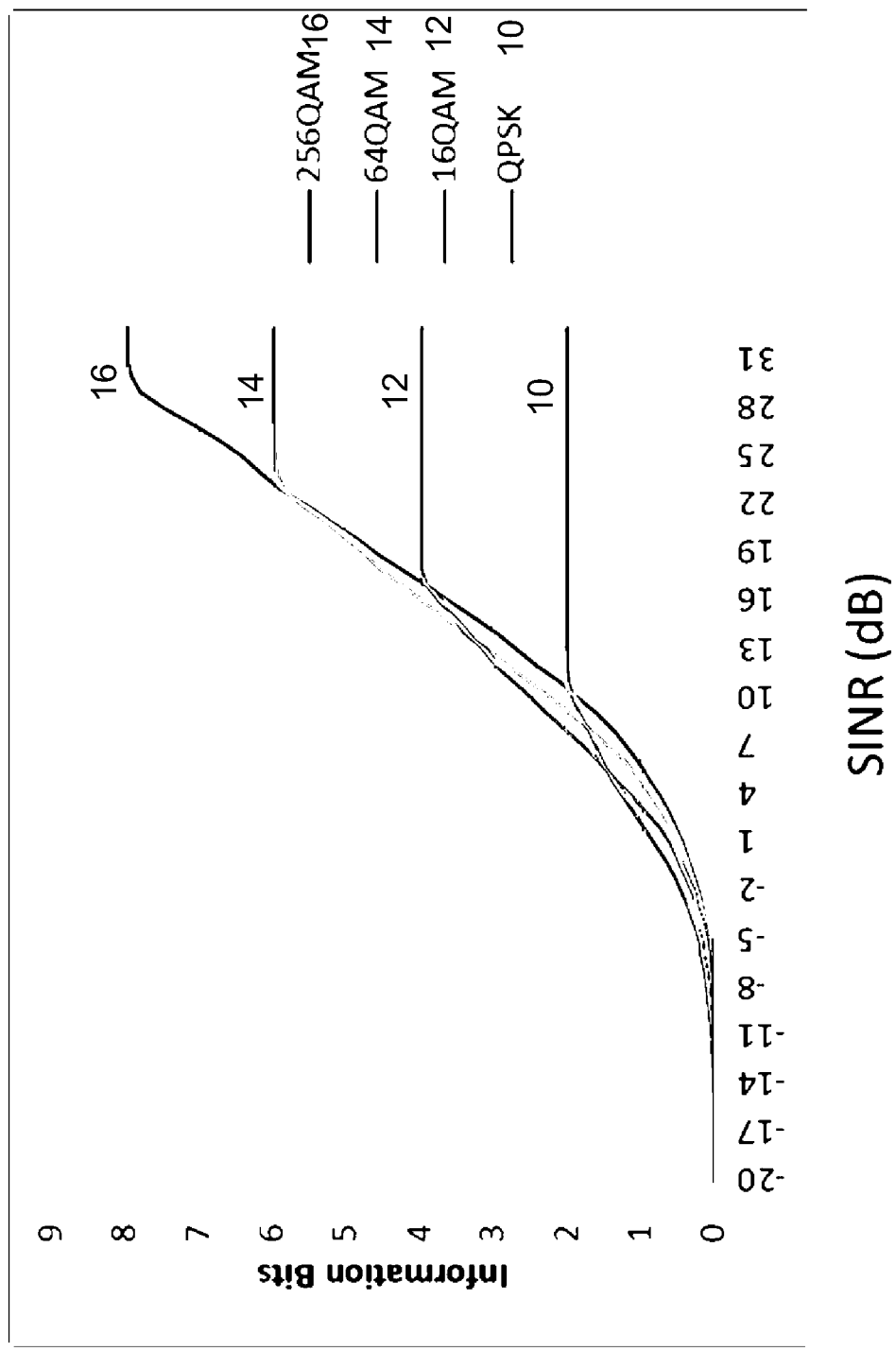
FIG. 2 is a graph illustrating information bits per resource element for QPSK, 16QAM, 64QAM, 256QAM vs. SINR at 10% BLER.

FIG. 2 is a graph illustrating information bits per resource element for QPSK, 16QAM, 64QAM, 256QAM vs. SINR at 10% BLER. The horizontal axis represents SINR in dB and the vertical axis represents the number of information bits. Line 10 represents values for QPSK 10, line 12 represents values for 16QAM 12, line 14 represents values for 64QAM 14, and line 16 represents values for 256QAM (16).

Particular embodiments may use the data illustrated in FIG. 2 to select the best information bits per RE among the available modulations:

infoBitsPerRe[$i$]=max{sinrInfoBitsTable [mod][SINR[$i$]]} mod=QPSK,16QAM,64QAM, and 256QAM

Because sinrInfoBitsTable(SINR)=max{sinrInfoBitsTable[mod]SINR]} for an SINR range from −20 dB to 32 dB, it can be computed offline and stored in memory. The above formula becomes:

infoBitsPerRe[$i$]=sinrInfoBitsTable(SINR[$i$])

The number of REs in RBG i is denoted numOfResPerRbg[i] and infoBitsPerRe[i] as its corresponding information bits per RE per layer can carry. The information bits that the $i^{th}$ RBG can carry can be expressed as:

infoBitsPerRbg[$i$]=infoBitsPerRe[$i$]*numOfResPerRbg[$i$]*nrofLayers, for i=1, 2, . . . , N which can be calculated for each UE before scheduling process.

Particular embodiments estimate the required information bits and number of RBGs. For example, to estimate the required information bits and number of RBGs for a new transmission, particular embodiments may use the following information. Particular embodiments may use the desired number of bits to be transmitted (i.e., amount of data in the transmit buffer), which is denoted as desiredNrofBits. Particular embodiments may define rawInfoBits=desiredNrofBits+crcBits+pddingBits, where pddingBits is a small integer value (e.g., 8) to accommodate the quantization error in TBS calculation. It ensures that all the data in the buffer will be scheduled if the wireless transmitter has enough resources to send it. Particular embodiments may use the available RBGs for allocation, which is specified as rbgStartIndex and rbgStopIndex. Particular embodiments may use the pre-calculated infoBitsPerRbg[i], i=1, 2, . . . , N, calculated above.

The accumulated information bits may be calculated by adding the information bits per RBG from the available RBGs one by one (or in any suitable multiple) until all the available RBGs are used or the value of accumulated information bits is greater than or equal to rawInfoBits. The pseudo code for this operation is as follows:

```
nrofRbgs = 0;
accInfoBits = 0;
for(i = rbgStartIndex; i <= rbgStopIndex; i++) {
    accInfoBits += infoBitsPerRbg[i];
    nrofRbgs++;
    if(accInfoBits >= (rawInfoBits) {break;}
}
```

After obtaining accInfoBits, the estimated required infoBits may be calculated as estimatedInfoBits=min{rawDataBits, accInfoBits). Because estimatedInfoBits may be used for calculating MCS and TBS, this step ensures that the determined TBS value is big enough to transmit all the data in the buffer.

Particular embodiments may determine an MCS to use for transmission. Based on Table 5.1.3.1-1 (referred to herein as Table 1) or Table 5.1.3.1-2 (referred to herein as Table 2) defined in 3GPP 38214-f00 Physical Layer Procedures for Data, particular embodiments know that code rate times modulation order gives spectral efficiency (also known as RE efficiency) in each row, which represents the number of bits per RE each layer can carry for a given MCS index. For example, if MCS index is 20, each RE can carry 5.33203125 information bits.

By using either Table 1 or 2, depending on the selected modulation mode, particular embodiments may determine the MCS based on the following inputs: (a) the estimated information bits (estimatedInfoBits) calculated above; (b) the number of required RBGs, nrofRbgs, calculated above; (c) number of layers, nrofLayers, which is determined from the rank; and RBG size.

At a first step, a wireless transmitter may calculate the total number of nominal REs totalNrofNominalRes=nrofRbgs*rbgSize*nrofLayers* nominalNrofResPerPrb, where nominalNrofResPerPrb is determined by a formula specified in section 5.1.3.2 in 3GPP 38214-f00 Physical Layer Procedures for Data.

At a second step, the wireless transmitter may estimate the RE efficiency estimatedReEfficiency=estimatedInfoBits/totalNrofNominalRes. At a third step, the wireless transmitter may search the RE Efficiency column in Table 1 or 2 and find the closest RE Efficiency value which is less than or equal to the calculated ReEfficiency and its corresponding MCS index. The pseudo code for the operation is as follows:

```
mcsIndex = minMcs - 1;
int i = minMcs;
while ((i <= maxMcs) && (estimatedReEfficiency >= reEfficiency[i])) {
    mcsIndex++;
    i++;
}
if (mcsIndex < minMcs) mcsIndex = minMcs;
```

Particular embodiments may determine a TBS for transmission. For example, after obtaining the MCS index, by using either Table 1 or 2, the wireless transmitter can find the corresponding modulation order and coding rate. Particular embodiments may use the TBS determination method specified in 38.214 section 5.1.3.2 to calculate the corresponding TBS value TBS=determineTBS(mcsIndex, totalNrofNominalRes).

Particular embodiments may adjust the determined MCS and TBS. For example, the MCS index and TBS value calculated from Section 5.1.3 may have the following drawbacks because of, for example, quantization errors when the actual total number of REs is different from totalNrofNominalRes.

One drawback is that the TBS value calculated from Section 5.1.3 may be smaller than desiredNrofBits even though the desired number of bits (desiredNrofBits) is less than or equal to the accumulated information bits (accInfoBits) minus CRC bits. As a result, the wireless transmitter may perform another new transmission to empty the data buffer, which increases delay and reduces transmission efficiency.

Another drawback is if the TBS value is significantly bigger than desiredNrofBits. As a result, the wireless transmitter may insert dummy bits in the data transmission, which may not be efficient either.

When the transmit buffer is full (i.e., desiredNrofBits>accInfoBits−crcBits), the TBS value selected may be smaller than accInfoBits minus crcBits. Particular embodiments provide an advantage by increasing the TBS with the condition TBS<=accInfoBits−crcBits to increase overall system throughput. Particular embodiments also check that the calculated TBS is between min Tbs and max Tbs.

To solve some of the technical problems described above, particular embodiments may adjust MCS and TBS to improve performance. The adjustment may use the following inputs: (a) the number of required RBGs (nrofRbgs) and the accumulated information bits (accInfoBits) calculated above; (b) the MCS index and TBS calculated above; (c) number of layers, nrofLayers, which may be determined from the rank; and RBG size.

In one example, the desired number of bits is less than or equal to the accumulated information bits minus CRC bits (desiredNrofBits<=accInfoBits−crcBits). If the transport block size is less than the desired number of bits (TBS<desiredNrofBits), particular embodiments may increase the MCS index until the transport block size is greater than or equal to the desired number of bits (TBS>=desiredNrofBits) to empty the data buffer. If the transport block size is greater than the desired number of bits (TBS>desiredNrofBits), particular embodiments may decrease the MCS index until the TBS reaches the smallest TBS value which is greater than or equal to desiredNrofBits to reduce the extra dummy bits.

The pseudo code for implementing the algorithm is as follows:

```
if(tbs < desiredNrofBits) {
    while((tbs < desiredNrofBits) && (mcsIndex < maxMcs)) {
        mcsIndex++;
        tbs = determineTBS(mcsIndex, totalNrofNominalRes);
    }
} else if(tbs > desiredNrofBits) {
    while((tbs > desiredNrofBits) && (mcsIndex > minMcs)) {
        newTbs = determineTBS(mcsIndex, totalNrofNominalRes);
        if(newTbs >= desiredNrofBits)
        {mcsIndex--; tbs = newTbs;}
        else break;
    }
}
```

If (TBS(mcsIndex)<desiredNrofBits) and TBS(mcsIndex+1)>(accInfoBits−crcBits), particular embodiments may perform the following steps. If additional PRBs are available, add one RBG at a time (or any suitable multiple) until with m additional RBGs totalNrofNominalRes=(nrofRbgs+ m)*rbgSize*nrofLayers*nominalNrofResPerPrb so that TBS=determineTBS(mcsIndex, totalNrofNominalRes) >=desiredNrofBits. If no more PRBS are available, particular embodiments may use the slightly higher TBS value, TBS(mcsIndex+1) to empty the data buffer.

In another example, the desired number of bits may be greater than the accumulated information bits minus crcBits (desiredNrofBits>accInfoBits−crcBits). If the transport block size is less than the accumulated information bits minus the CRC bits (TBS<(accInfoBits−crcBits), particular embodiments may increase MCS index until TBS reaches the maximum TBS value with the condition, TBS<=(accInfoBits−crcBits), to transmit more data. If the transport block size is greater than the accumulated information bits minus the CRC bits (TBS>(accInfoBits−crcBits)), particular embodiments may decrease MCS index until TBS reaches the maximum TBS value with the condition, TBS<=(accInfoBits−crcBits), to meet the channel quality requirement.

The pseudo code for implementing the operation is as follows:

```
if(tbs < (accInfoBits-crcBits)){
    while((tbs < (accInfoBits-crcBits)) && (mcsIndex < maxMcs)) {
        newTbs = determineTBS(mcsIndex, totalNrofNominalRes);
        if(newTbs < (accInfoBits-crcBits))
{mcsIndex++; tbs = newTbs;}
        else break;
    }
}
else if(tbs > (accInfoBits-crcBits)) {
    while((tbs > (accInfoBits-crcBits)) && (mcsIndex > minMcs)){
```

-continued

```
    newTbs = determineTBS(mcsIndex, totalNrofNominalRes);
    if(newTbs > (accInfoBits-crcBits))
{mcsIndex--; tbs = newTbs;}
        else break;
    }
}
```

Particular embodiments may perform a check to validate that the TBS is in an acceptable range. For example, after adjusting the TBS value, particular embodiments may ensure that the calculated TBS value is between a minimum TBS and a maximum TBS (min Tbs and max Tbs). The pseudo code for implementing the operation is as follows:

```
// Reduce mcs until tbs <= maxTbSize
    while(tbs > maxTbSize) {
        mcsIndex--;
        tbs = determineTBS(mcsIndex, totalNrofNominalRes);
    }
    // Increase mcs until tbs >= minTbSize
    while(tbs < minTbSize) {
        mcsIndex++;
        tbs = determineTBS(mcsIndex, totalNrofNominalRes);
    }
```

Particular embodiments may determine an MCS State. For example, after obtaining the final MCS index and TBS, particular embodiments may determine the MCS state using the TBS value and the accumulated information bits (accInfoBits) calculated above.

The algorithm is as follows:

```
mcsState = NORMAL
if((accInfoBits-crcBits) < TBS*mcsStateTooAggressiveThreshold) {
    mcsState = TOO_AGGRESSIVE;
}
else if((accInfoBits-crcBits) < TBS*mcsStateAggressiveThreshold) {
    mcsState = AGGRESSIVE;
}
else if((accInfoBits-crcBits) > TBS*mcsStateConservativeThreshold) {
    mcsState = CONSERVATIVE;
}
```

The values mcsStateTooAggressiveThreshold, mcsStateAggressiveThreshold, and mcsStateConservativeThreshold are pre-determined positive values, with the conditions: mcsStateTooAggressiveThreshold<mcsStateAggressiveThreshold<1 and mcsStateConservativeThreshold>1. For example, mcsStateTooAggressiveThreshold, mcsStateAggressiveThreshold, and mcsStateConservativeThreshold can be configured as 0.7, 0.9 and 1.1, respectively.

The MCS State may be used for outer-loop adjustment. When MCS State is set to AGGRESSIVE, the MCS index selected is higher than the current channel condition can support. As a result, more decoding errors may tend to occur. When a NACK feedback is received for a new transmission, the outer-loop adjustment value may not be decreased. When the MCS State is set to CONSERVATIVE, the MCS index selected is lower than the current channel condition can support. This can happen when MCS reduction is performed as described above. As a result, less decoding errors may be perceived. When an ACK feedback is received for a new transmission, the outer-loop adjustment value may not be increased.

When the MCS State is set to TOO_AAGRSSIVE, the MCS selected is too high to be supported by the channel quality. The wireless transmitter does not have enough resources to support the new transmission. As a result, the MCS and TBS selection result may be discarded for the current time slot and wait for the next slot to be scheduled.

Particular embodiments may include re-transmission and MCS selection for re-transmission. For an initial transmission, if a wireless transmitter receives NACK feedback, the wireless transmitter (e.g., gNB) knows that the wireless receiver (e.g., UE) has successfully decoded the downlink control information (DCI) transmitted on the physical downlink control channel (PDCCH) but failed to decode PDSCH. As a result, a re-transmission is required. Because the wireless receiver already knows the TBS from the original transmission, for a re-transmission, particular embodiments may select the MCS index based on the current channel condition.

For example, the wireless transmitter may calculate the information carrying bits per RBG as described above. The wireless transmitter may calculate the accumulated information bits, accInfoBits, and the required number of RBGs as described above, but by replacing desiredNrofBits with the known TBS value.

If ((accInfoBits-crcBits)<TBS*reTxRejectThreshold, the re-transmission request may be rejected because of poor channel condition and/or too few available RBGs for resource allocation.

Particular embodiments may include reTxRejectThreshold, which may comprise a pre-configured parameter less than 1. For example, reTxRejectThreshold may be configured as 0.5. The wireless transmitter may calculate the estimated information bits as estimatedInfoBits=accInfoBits. The wireless transmitter may calculate the MCS index described above. From the MCS index, particular embodiments may find its corresponding modulation order. The actual MCS indexes for re-transmission defined in Table 1 are from MCS 29 to 31. If it is QPSK, the actual MCS index for re-transmission is MCS 29. If it is 16QAM or 64QAM, the actual MCS index for re-transmission is MCS 30 or 31, respectively.

The actual MCS indexes for re-transmission defined in Table 2 are from MCS 28 to 31. If it is QPSK, the actual MCS index for re-transmission is MCS 28. If it is 16QAM, 64QAM, or 256QAM, the actual MCS index for re-transmission is MCS 29, 30, or 31, respectively.

Because the wireless transmitter already knows the TBS value from the original transmission, by using the modulation order and the number of RBGs, the wireless transmitter can determine the code rate. The previous examples are illustrated in flow chart form in FIGS. 3A-3E.

FIGS. 3A-3E are a flow diagram illustrating an example method in a wireless transmitter, according to particular embodiments. In particular embodiments, one or more steps of FIGS. 3A-3E may be performed by a wireless transmitter, such as network node 120 or wireless device 110 of network 100, described with respect to FIG. 1.

Figure 3A:
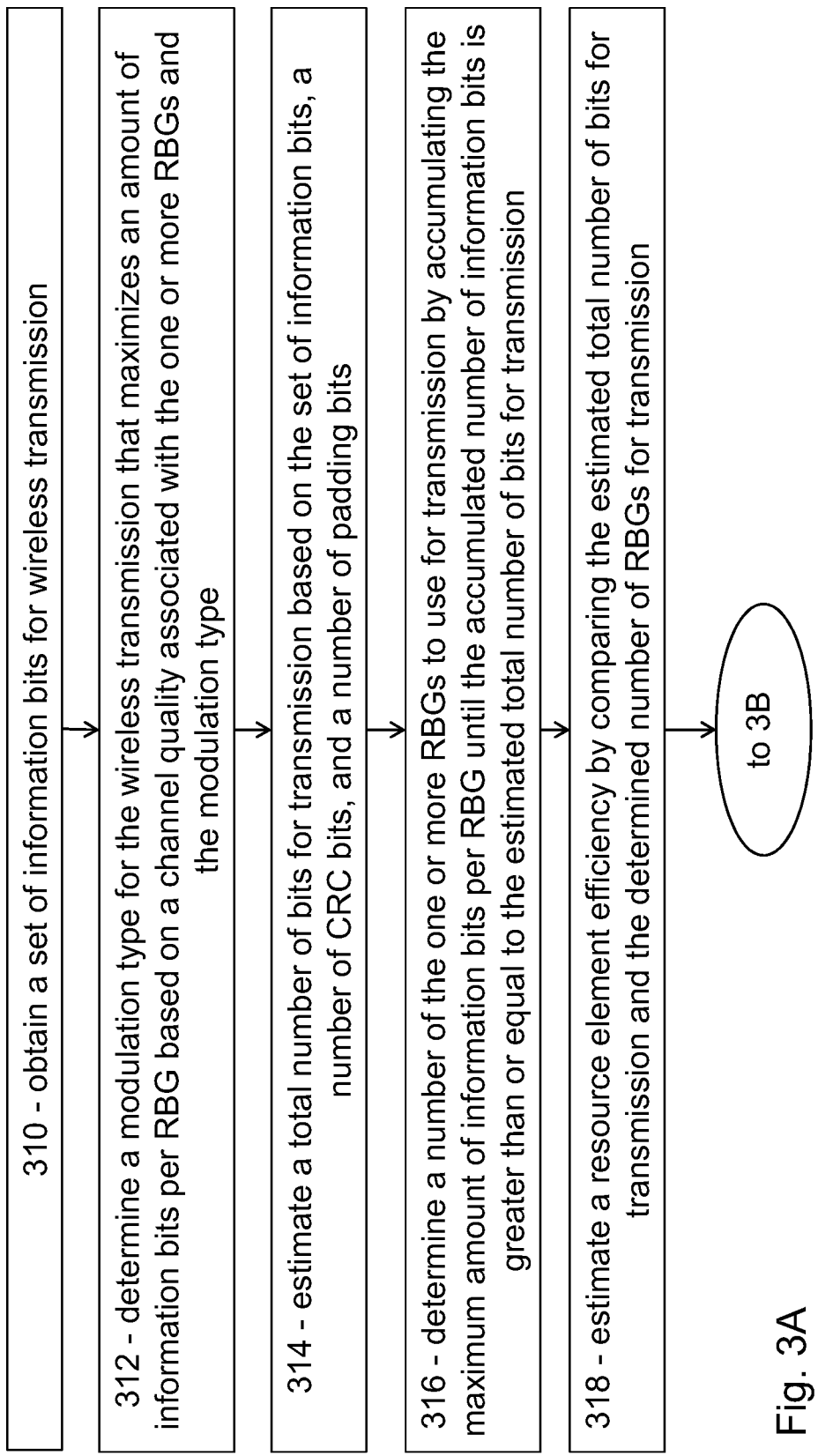

The method begins at step 310 of FIG. 3A, where the wireless transmitter obtains a set of information bits for wireless transmission using one or more RBGs. For example, network node 120 may obtain user data, control data, etc. for transmission to wireless device 110. The data for transmission comprises a set of information bits. The number of information bits in the set of information bits may also be referred to as the desired number of information bits. Network node 120 transmits the information bits in one or more RBGs.

At step 312, the wireless transmitter determines a modulation type for the wireless transmission that maximizes an amount of information bits per RBG based on a channel quality associated with the one or more RBGs and the modulation type. For example, network node 120 may receive a CSI report from wireless device 110. The CSI report includes an indication of the channel quality between network node 120 and wireless device 110. Network node 120 may use the channel quality information in conjunction with a table, such as a table based on the information in FIG. 2, to optimize the information bits per RE among the available MCS. An advantage of this step is that the number of information carrying bits per RBG or PRB may be determined based on channel condition (e.g., SINR), instead of large tables as used in LTE.

At step 314, the wireless transmitter estimates a total number of bits for transmission based on the desired number of bits, a number of CRC bits, and a number of padding bits. For example, network node 120 may determine the total number of bits for transmission (e.g., rawInfoBits described above) by adding the desired number of bits, CRC bits, and padding bits. The number of padding bits may be a small integer value (e.g., 8) to accommodate the quantization error in TBS calculation. It ensures that network node 120 schedules all the data in the buffer if network node 120 has enough resources to send all the data.

At step 316, the wireless transmitter determines a number of the one or more RBGs to use for transmission by accumulating the maximum amount of information bits per RBG until the accumulated number of information bits is greater than or equal to the estimated total number of bits for transmission. For example, network node 120 may add the information bits per RBG from the available RBGs one by one (or in any other suitable increments) until all the available RBGs are used or the value of the accumulated information bits (e.g., accInfoBits described above) is greater than or equal to total number of bits for transmission (e.g., rawInfoBits described above). Network node 120 may estimate a required number of information bits by taking the smaller of the total number of bits for transmission and the number of accumulated information bits.

At step 318, the wireless transmitter estimates a resource element efficiency by comparing the total number of bits for transmission and the determined number of RBGs for transmission. For example, network node 120 may calculate the total number of nominal REs totalNrofNominalRes=nrofRbgs*rbgSize*nrofLayers* nominalNrofResPerPrb, and estimate the RE efficiency estimatedReEfficiency=estimatedInfoBits/totalNrofNominalRes as described above.

Figure 3B:
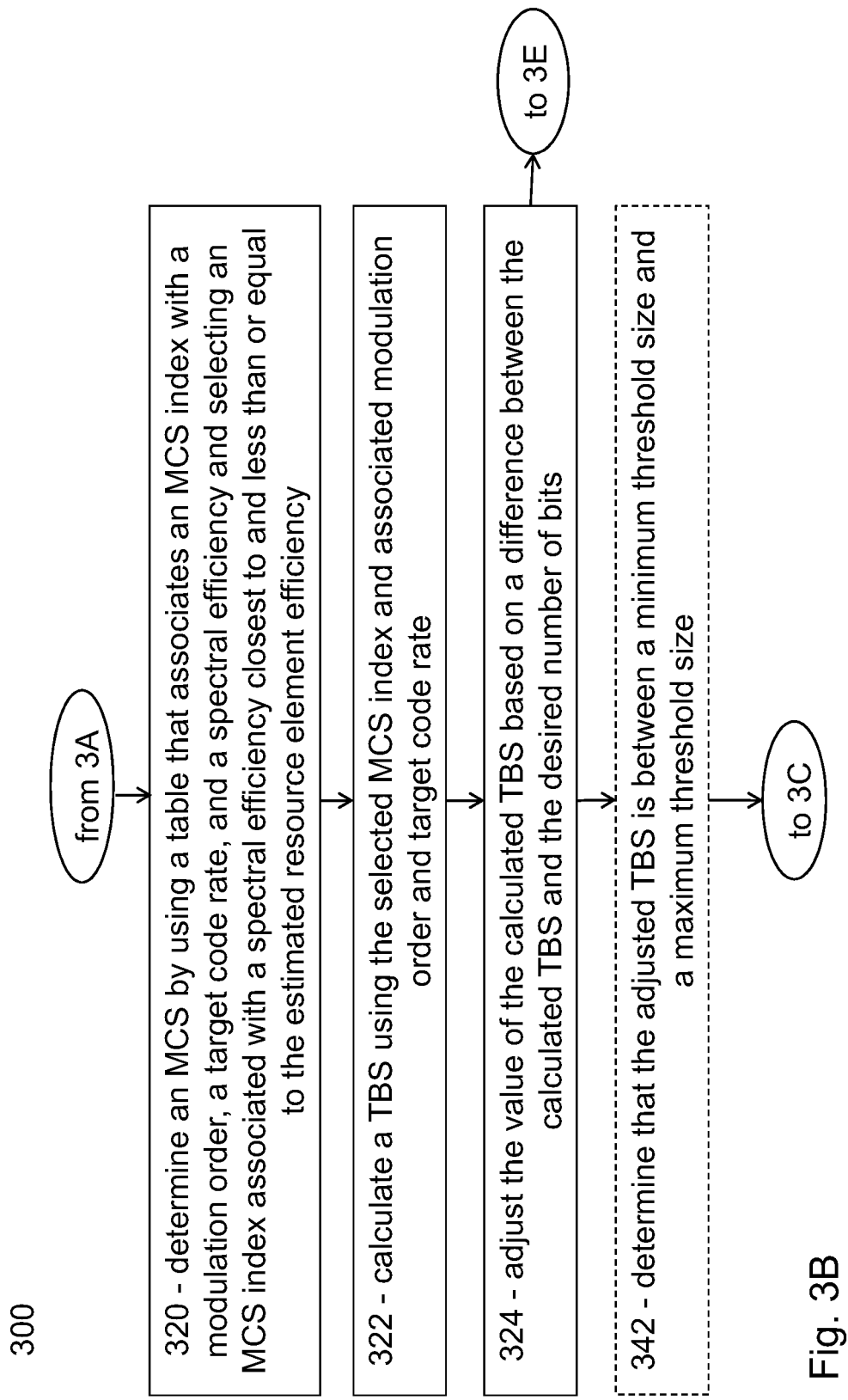

At step 320 of FIG. 3B, the wireless transmitter determines an MCS by using a table that associates an MCS index with a modulation order, a target code rate, and a spectral efficiency and selecting an MCS index associated with a spectral efficiency closest to and less than or equal to the estimated resource element efficiency. For example, network node 120 may search the RE Efficiency column in Table 1 or 2 described above and find the closest RE Efficiency value which is less than or equal to the calculated ReEfficiency and its corresponding MCS index.

At step 322, the wireless transmitter calculates a TBS using the selected MCS index and associated modulation order and target code rate. For example, network node 120 may use the MCS index to find the corresponding modulation order and target code rate using Tables 1 or 2 described above. Particular embodiments may use the TBS determination method specified in 38.214 section 5.1.3.2 to calculate the corresponding TBS value.

At step 324, the wireless transmitter adjusts the value of the calculated TBS based on a difference between the calculated TBS and the desired number of bits. For example, the calculated TBS may be sub-optimal and network node 120 may adjust the TBS, resulting in a more accurate calculation and more efficient operation. Some examples of adjusting the calculated TBS are illustrated in FIG. 3E.

For example, the wireless transmitter may, at step 326, compare the desired number of bits and the accumulated number of information bits minus CRC bits. For example, the wireless transmitter may determine the desired number of bits is less than or equal to the accumulated number of information bits minus CRC bits and continue to step 328.

At step 328, the wireless transmitter may determine that the calculated TBS is less than the desired number of bits and continue to step 330 where the wireless transmitter increases the MCS index until an associated TBS is greater than or equal to the desired number of bits.

At step 328, the wireless transmitter may determine that the calculated TBS is greater than the desired number of bits and continue, as one example, to step 330 where the wireless transmitter decreases the MCS index until an associated TBS reaches the smallest value that is greater than or equal to the desired number of bits.

At step 328, the wireless transmitter may determine that the calculated TBS is greater than the desired number of bits and, as another example, the method may continue to step 334 where the wireless transmission increases the number of RGBs to use for transmission. For example, network node 120 may determine that (TBS(mcsIndex)<desiredNrofBits) and TBS(mcsIndex+1)>(accInfoBits−crcBits). If additional PRBs are available, network node 120 may add one RBG at a time (or any other suitable increment) until totalNrofNominalRes=(nrofRbgs+m) *rbgSize*nrofLayers*nominalNrofResPerPrb so that TBS=determineTBS(mcsIndex, totalNrofNominalRes) >=desiredNrofBits. The method may return to step 318 where the wireless transmitter estimates the resource element efficiency, determine the MCS, and calculate the TBS using the increased number of RBGs.

Returning to step 326, the wireless transmitter may determine the total number of bits for transmission is greater than the accumulated number of information bits minus the CRC bits and continue to step 336.

At step 336, the wireless transmitter may determine that the calculated TBS is less than the accumulated number of information bits minus the CRC bits and continue to step 338 where the wireless transmitter increases the MCS index until an associated TBS is greater than or equal to the accumulated number of information bits minus the CRC bits.

At step 336, the wireless transmitter may determine that the calculated TBS is greater than the accumulated number of information bits minus the CRC bits and continue to step 340 where the wireless transmitter decreases the MCS index until an associated TBS reaches the smallest value that is greater than or equal to the accumulated number of information bits minus the CRC bits.

Returning to step 342 of FIG. 3B, the wireless transmitter determines that the adjusted TBS is between a minimum threshold size and a maximum threshold size. For example, adjusting the TBS in the previous step may adjust the TBS out of an acceptable range of values. Network node 120, for example, may verify that the adjusted TBS value is between a minimum and maximum threshold. Network node 120 may further adjust the TBS value, if needed, to bring the TBS value back into an acceptable range.

Figure 3C:
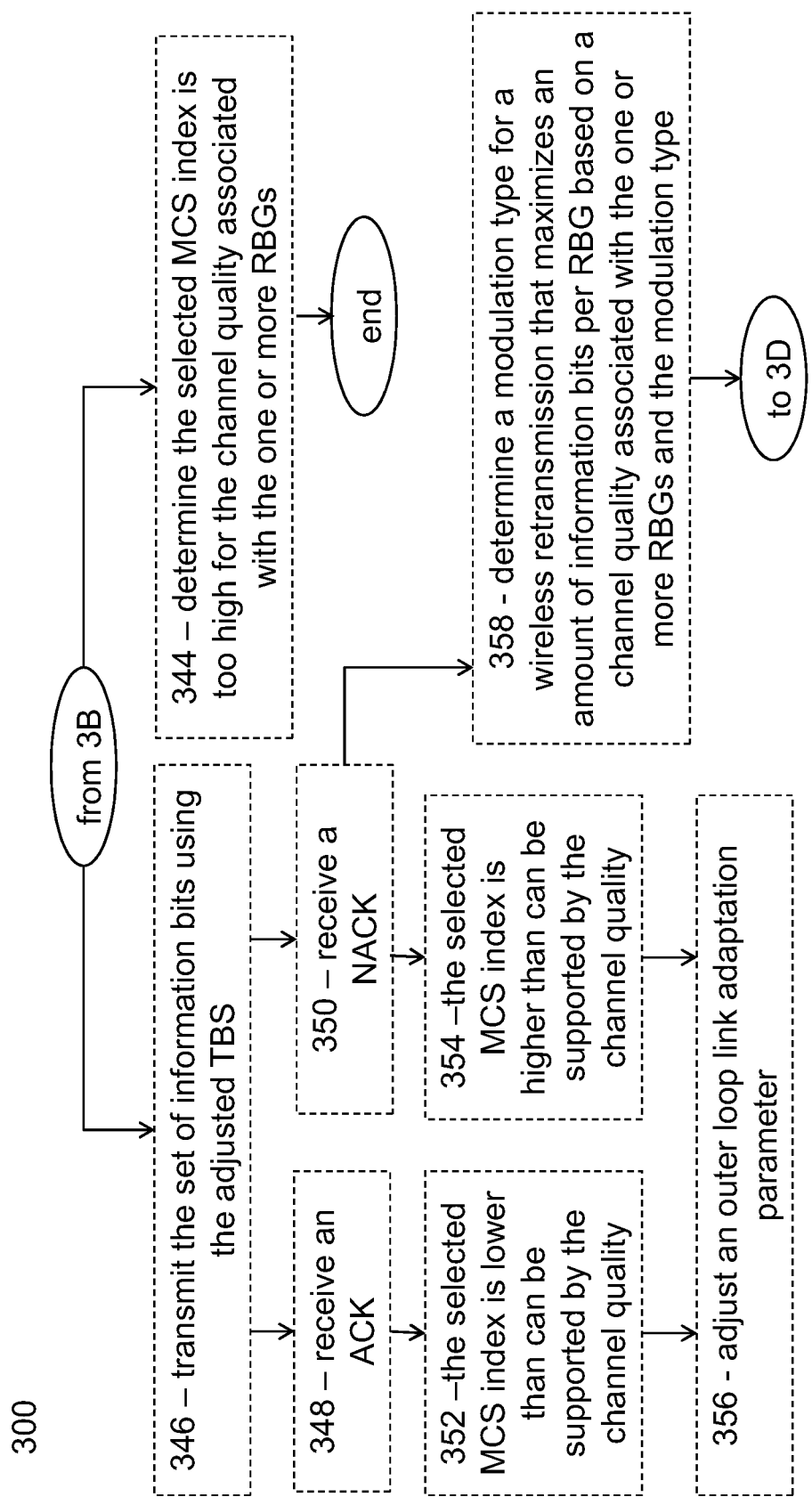
Figure 3E:
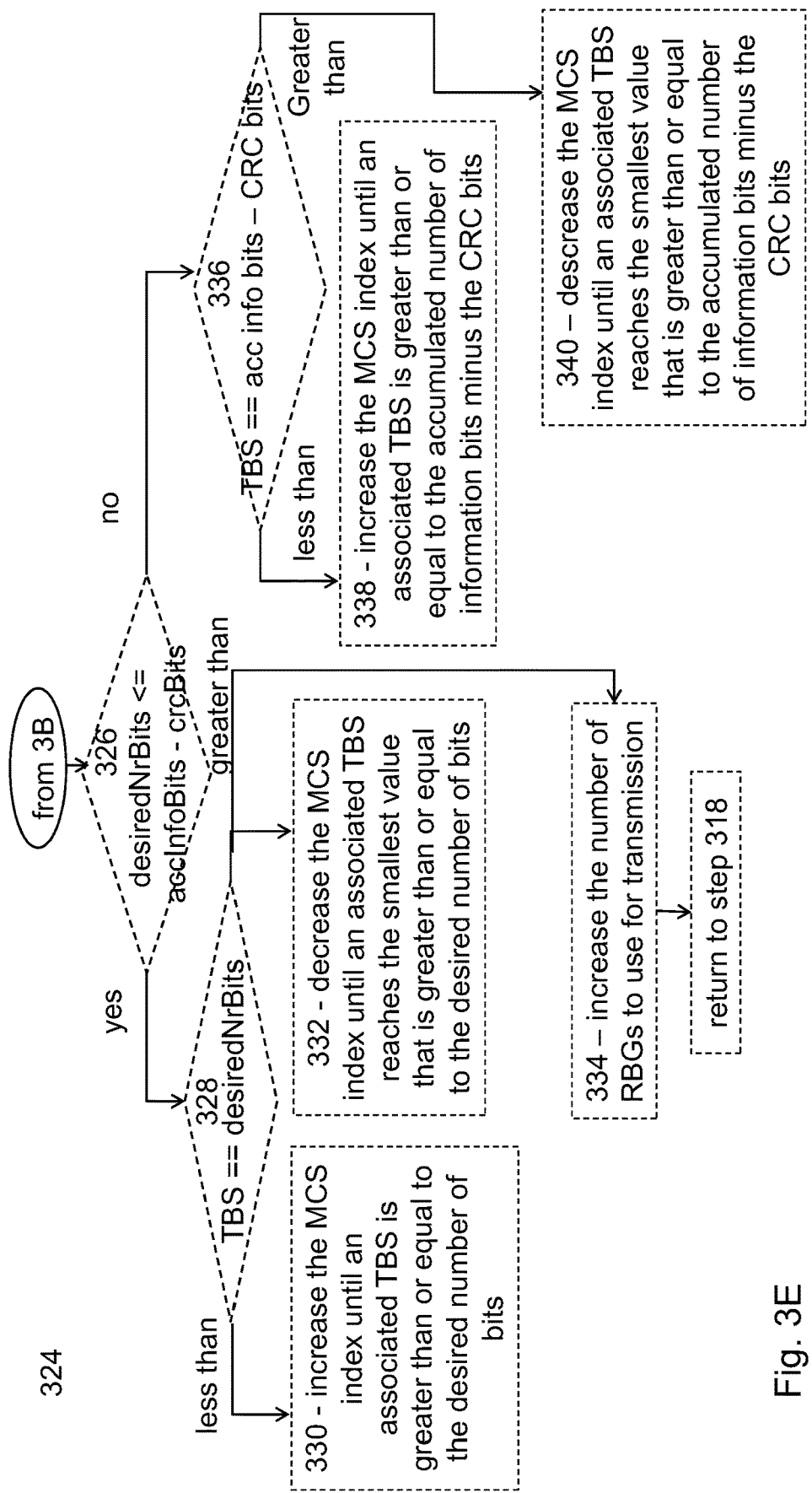

If the wireless transmitter determines the selected MCS index is too high for the channel quality associated with the one or more RBGs at step 344 of FIG. 3C, then the wireless transmitter may determine not to transmit the set of information bits, or to wait until the next scheduling opportunity and try again. Otherwise the method continues to step 344 of FIG. 3C, where the wireless transmitter transmits the set of information bits using the adjusted TBS.

In response to the transmission the wireless transmitter may receive an ACK or a NACK. At step 348, the wireless transmitter receives an ACK. The wireless transmitter may determine, at step 352, that the selected MCS index is lower than can be supported by the channel quality associated with the one or more RBGs (e.g., using the MCS State described above) and continue to step 356 where the wireless transmitter adjusts an outer loop link adaptation parameter based on the determination that the selected MCS index is lower than the channel quality can support.

At step 350, the wireless transmitter receives a NACK. The wireless transmitter may determine, at step 354, that the selected MCS index is higher than can be supported by the channel quality associated with the one or more RBGs (e.g., using the MCS State described above) and continue to step 356 where the wireless transmitter adjusts an outer loop link adaptation parameter based on the determination that the selected MCS index is higher than the channel quality can support.

From step 350, the wireless transmitter may also continue to step 358 to perform a retransmission (as described above) based on the received NACK. At step 358, the wireless transmitter determines a modulation type for a wireless retransmission that maximizes an amount of information bits per RBG based on a channel quality associated with the one or more RBGs and the modulation type. Step 358 is similar to step 312 but the channel quality may have changed since step 312.

At step 360 of FIG. 3D, the wireless transmitter determines a number of the one or more RBGs to use for retransmission by accumulating the maximum amount of information bits per RBG until the accumulated number of information bits is greater than or equal to the TBS plus CRC bits. Step 360 is similar to step 316 except the wireless transmitter uses the TBS plus CRC bits in place of the total number of bits for transmission. A particular advantage is that the number of operations performed for a retransmission may be less than the number of operations performed for the original transmission.

At step 362, the wireless transmitter estimates a resource element efficiency for the retransmission by comparing the TBS plus CRC bits and the determined number of RBGs for retransmission, similar to step 318. At step 364, the wireless transmitter determines an MCS for the retransmission by using the table that associates an MCS index with a modulation order, a target code rate, and a spectral efficiency and selecting an MCS index associated with a spectral efficiency closest to and less than or equal to the estimated resource element efficiency similar to step 320.

At step 366, the wireless transmitter determines a modulation order based on the selected MCS index. The wireless transmitter retransmits the set of information bits using the determined modulation order and TBS at step 368.

Modifications, additions, or omissions may be made to method 300 of FIGS. 3A-3E. Additionally, one or more steps in the method of FIGS. 3A-3E may be performed in parallel or in any suitable order. As just one example, determining the MCS State may be performed before receiving an ACK or NACK. The steps may be repeated over time as necessary. In some embodiments, the wireless transmitter may comprise a wireless device.

Figure 4B:
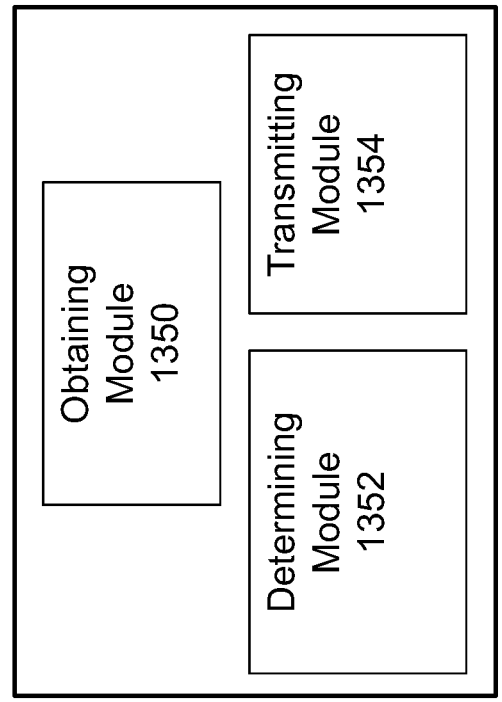
FIG. 4B is a block diagram illustrating example components of a wireless device.
Figure 4A:
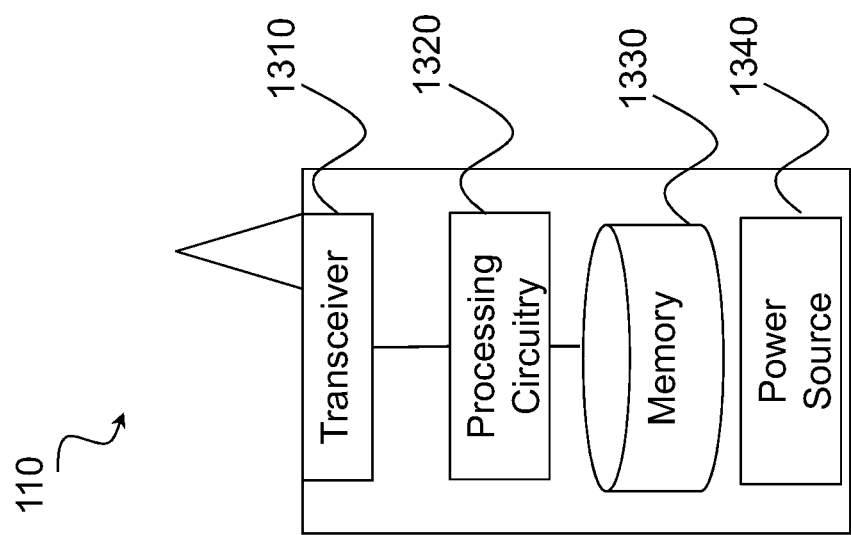
FIG. 4A is a block diagram illustrating an example embodiment of a wireless device.

FIG. 4A is a block diagram illustrating an example embodiment of a wireless device. The wireless device is an example of the wireless devices 110 illustrated in FIG. 1.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 4A) responsible for providing certain aspects of the wireless device's functionality, including any of the functionality described above and/or any additional functionality (including any functionality necessary to support the solution described above).

FIG. 4B is a block diagram illustrating example components of a wireless device 110. The components may include obtaining module 1350, determining module 1352, and transmitting module 1354.

Obtaining module 1350 may perform the obtaining functions of wireless device 110. For example, obtaining module 1350 may obtain a TBS from network node 120. In certain embodiments, obtaining module 1350 may include or be included in processing circuitry 1320. In particular embodiments, obtaining module 1350 may communicate with determining module 1352 and transmitting module 1354.

Determining module 1352 may perform the determining functions of wireless device 110. For example, determining module 1352 may determine an MCS, TBS, and/or MCS State based on information received from network node 120. In certain embodiments, determining module 1352 may include or be included in processing circuitry 1320. In particular embodiments, determining module 1352 may communicate with obtaining module 1350 and transmitting module 1354.

Transmitting module 1354 may perform the transmitting functions of wireless device 110. For example, transmitting module 1354 may transmit information bits using the MCS and TBS determined by determining module 1352. In certain embodiments, transmitting module 1354 may include or be included in processing circuitry 1320. In particular embodiments, transmitting module 1354 may communicate with obtaining module 1350 and determining module 1352.

Figure 5B:
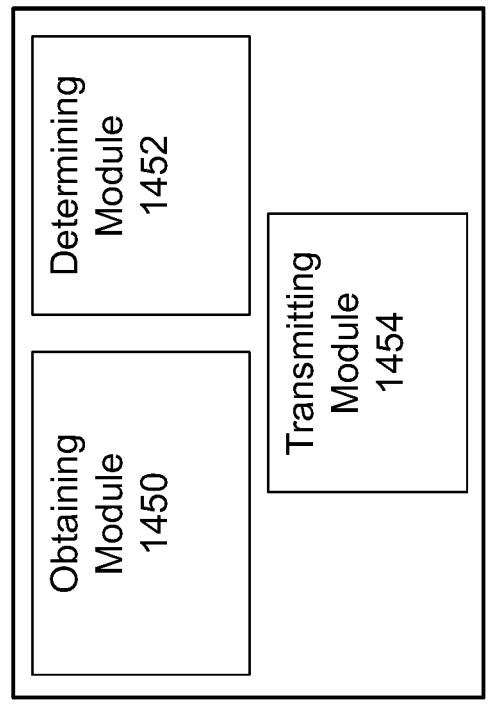
FIG. 5B is a block diagram illustrating example components of a network node.
Figure 5A:
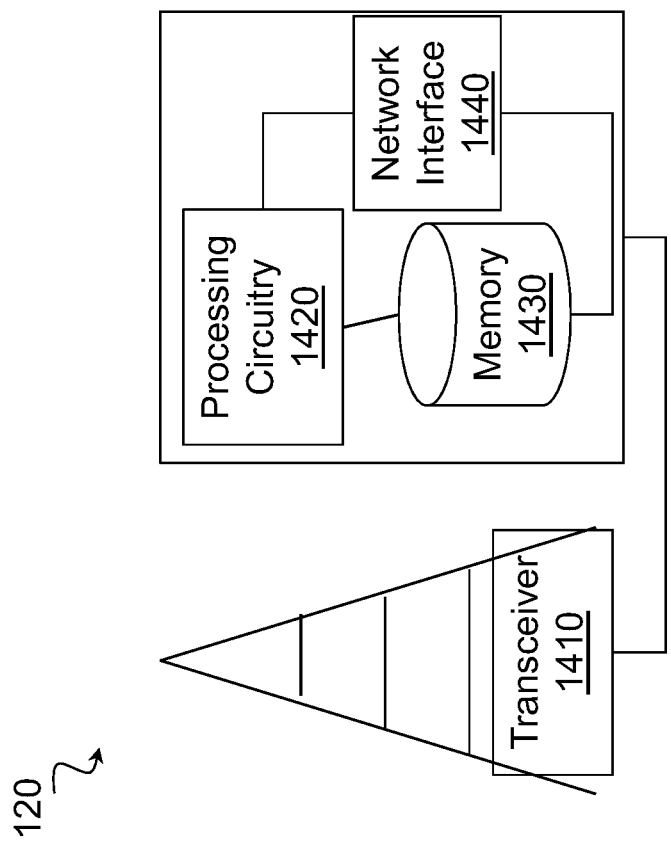
FIG. 5A is a block diagram illustrating an example embodiment of a network node.

FIG. 5A is a block diagram illustrating an example embodiment of a network node. The network node is an example of the network node 120 illustrated in FIG. 1. In particular embodiments, the network node is capable of performing link adaption by calculating information carrying bits per RBG or PRB based on a channel condition (e.g., signal to interference plus noise ratio (SINR)); (2) estimating the required information bits and number of RBGs based on the desired number of bits to be transmitted and the number of available RBGs; (3) determining the MCS and TBS based on the estimated information bits, the required number of RBGs, number of layers, and RBG size; (4) adjusting the MCS and TBS based on the MCS index and TBS calculated at step 3, the number of required RBGs, and the accumulated information bits calculated from step 2; and determining an MCS state based on the TBS and the accumulated information bits.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 4A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

FIG. 5B is a block diagram illustrating example components of a network node 120. The components may include obtaining module 1450, determining module 1452, and transmitting module 1454.

Obtaining module 1450 may perform the obtaining functions of network node 120. For example, receiving module 1450 may obtain a set of information bits for wireless transmission. In certain embodiments, obtaining module 1450 may include or be included in processing circuitry 1420. In particular embodiments, obtaining module 1450 may communicate with determining module 1452 and transmitting module 1454.

Determining module 1452 may perform the determining functions of network node 120. For example, determining module 1452 may determine an MCS, TBS, and/or MCS State according to any of the embodiments and examples described herein. In certain embodiments, determining module 1452 may include or be included in processing circuitry 1420. In particular embodiments, determining module 1452 may communicate with obtaining module 1450 and transmitting module 1454.

Transmitting module 1454 may perform the transmitting functions of network node 120. For example, transmitting module 1454 may transmit information bits using the MCS and TBS determined by determining module 1452. In certain embodiments, transmitting module 1454 may include or be included in processing circuitry 1420. In particular embodiments, transmitting module 1454 may communicate with obtaining module 1450 and determining module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
5G Fifth Generation
BBU Baseband Unit
BLER Block Error Rate BTS Base Transceiver Station
CC Component Carrier
CQI Channel Quality Information
CSI Channel State Information
D2D Device to Device
DAI Downlink Assignment Index
DCI Downlink Control Information
DFT Discrete Fourier Transform
DMRS Demodulation Reference Signal
eNB eNodeB
FDD Frequency Division Duplex
FFT Fast Fourier Transform
FS Frame Structure
HARQ Hybrid Automatic Repeat Request
HTTP Hypertext Transfer Protocol
gNB Next-generation NodeB
LA Link Adaptation
LAA Licensed-Assisted Access
LBT Listen-before-talk
LTE Long Term Evolution
LTE-U LTE in Unlicensed Spectrum
M2M Machine to Machine
MCS Modulation and Coding Scheme
MIB Master Information Block
MIMO Multi-Input Multi-Output
MTC Machine Type Communication
NR New Radio
OFDM Orthogonal Frequency Division Multiplexing
PDCCH Physical Downlink Control Channel
PDSCH Physical Downlink Shared Channel
PRB Physical Resource Block
PUCCH Physical Uplink Control Channel
PUSCH Physical Uplink Shared Channel
RAN Radio Access Network
RAT Radio Access Technology
RBG Resource Block Group
RBS Radio Base Station
RE Resource Element
RNC Radio Network Controller
RRC Radio Resource Control
RRH Remote Radio Head
RRM Radio Resource Management
RRU Remote Radio Unit
SCell Secondary Cell
SI System Information
SIB System Information Block
sPUCCH Short PUCCH
sPUSCH Short PUSCH
sPDCCH short Physical Downlink Control Channnwel
sTTI Short TTI
TB Transport Block
TBS Transport Block Size
TCP Transmission Control Protocol
TDD Time Division Duplex
TTI Transmission Time Interval
UE User Equipment
UL Uplink
UTRAN Universal Terrestrial Radio Access Network
WAN Wireless Access Network

The invention claimed is:

1. A method for use in a wireless transmitter of a wireless communication network, the method comprising:
obtaining a set of information bits to be transmitted wirelessly using one or more radio resource block groups (RBGs), wherein the number of bits in the set of information bits is referred to as the desired number of bits;
determining a modulation type for the wireless transmission that maximizes an amount of information bits per RBG based on a channel quality associated with the one or more RBGs and the modulation type;
estimating a total number of bits for transmission based on the desired number of bits, a number of cyclic redundancy check (CRC) bits, and a number of padding bits;
determining a number of the one or more RBGs to use for transmission by accumulating the maximum amount of information bits per RBG until the accumulated number of information bits is greater than or equal to the estimated total number of bits for transmission;
estimating a resource element efficiency by comparing the estimated total number of bits for transmission and the determined number of RBGs for transmission;
determining a modulation and coding scheme (MCS) by using a table that associates an MCS index with a modulation order, a target code rate, and a spectral efficiency and selecting an MCS index associated with a spectral efficiency closest to and less than or equal to the estimated resource element efficiency;
calculating a transport block size (TBS) using the selected MCS index and associated modulation order and target code rate;
adjusting the value of the calculated TBS based on a difference between the calculated TBS and the desired number of bits; and
transmitting the set of information bits using the adjusted TBS.

2. The method of claim 1, wherein adjusting the value of the calculated TBS comprises:
determining the desired number of bits is less than or equal to the accumulated number of information bits minus CRC bits;
determining whether the calculated TBS is less than or greater than the desired number of bits;
upon determining the calculated TBS is less than the desired number of bits, increasing the MCS index until an associated TBS is greater than or equal to the desired number of bits; and
upon determining the calculated TBS is greater than the desired number of bits, decreasing the MCS index until an associated TBS reaches the smallest value that is greater than or equal to the desired number of bits.

3. The method of claim 1, wherein adjusting the value of the calculated TBS comprises:
determining the desired number of bits is less than or equal to the accumulated number of information bits minus CRC bits;
determining the calculated TBS is less than the desired number of bits;
increasing the number of RBGs to use for transmission; and
estimating the resource element efficiency, determining the MCS, and calculating the TBS using the increased number of RBGs.

4. The method of claim 1, wherein adjusting the value of the calculated TBS comprises:
determining the estimated total number of bits for transmission is greater than the accumulated number of information bits minus the CRC bits;
determining whether the calculated TBS is less than or greater than the accumulated number of information bits minus the CRC bits;
upon determining the calculated TBS is less than the accumulated number of information bits minus the CRC bits, increasing the MCS index until an associated TBS is greater than or equal to the accumulated number of information bits minus the CRC bits; and upon determining the calculated TBS is greater than the accumulated number of information bits minus the CRC bits, decreasing the MCS index until an associated TBS reaches the smallest value that is greater than or equal to the accumulated number of information bits minus the CRC bits.

5. The method of claim 1, further comprising determining that the adjusted TBS is between a minimum threshold size and a maximum threshold size.

6. The method of claim 1, further comprising:
determining that the selected MCS index is higher than can be supported by the channel quality associated with the one or more RBGs;
receiving a negative acknowledgement (NACK) for the transmitted set of information bits; and
adjusting an outer loop link adaptation parameter based on the determination that the selected MCS index is higher than the channel quality can support.

7. The method of claim 1, further comprising:
determining that the selected MCS index is lower than can be supported by the channel quality associated with the one or more RBGs;
receiving a positive acknowledgement (ACK) for the transmitted set of information bits; and
adjusting an outer loop link adaptation parameter based on the determination that the selected MCS index is lower than the channel quality can support.

8. The method of claim 1, further comprising:
determining that the selected MCS index is too high for the channel quality associated with the one or more RBGs; and
not transmitting the set of information bits.

9. The method of claim 1, further comprising:
receiving a negative acknowledgement (NACK) for the transmitted set of information bits;
determining modulation type for a wireless retransmission that maximizes an amount of information bits per RBG based on a channel quality associated with the one or more RBGs and the modulation type;
determining a number of the one or more RBGs to use for retransmission by accumulating the maximum amount of information bits per RBG until the accumulated number of information bits is greater than or equal to the TBS plus CRC bits;
estimating a resource element efficiency for the retransmission by comparing the TBS plus the CRC bits and the determined number of RBGs for retransmission;
determining an MCS for the retransmission by using the table that associates an MCS index with a modulation order, a target code rate, and a spectral efficiency and selecting an MCS index associated with a spectral efficiency closest to and less than or equal to the estimated resource element efficiency;
determining a modulation order based on the selected MCS index; and
retransmitting the set of information bits using the determined modulation order and TBS.

10. The method of claim 1, wherein the wireless transmitter comprises a network node.

11. The method of claim 1, wherein the wireless transmitter comprises a wireless device.

12. A wireless transmitter of a wireless communication network, the wireless transmitter comprising processing circuitry operable to:

obtain a set of information bits for wireless transmission using one or more radio resource block groups (RBGs), wherein the number of bits in the set of information bits is referred to as the desired number of bits;
determine a modulation type for the wireless transmission that maximizes an amount of information bits per RBG based on a channel quality associated with the one or more RBGs and the modulation type;
estimate a total number of bits for transmission based on the desired number of information bits, a number of cyclic redundancy check (CRC) bits, and a number of padding bits;
determine a number of the one or more RBGs to use for transmission by accumulating the maximum amount of information bits per RBG until the accumulated number of information bits is greater than or equal to the estimated total number of bits for transmission;
estimate a resource element efficiency by comparing the total number of bits for transmission and the determined number of RBGs for transmission;
determine a modulation and coding scheme (MCS) by using a table that associates an MCS index with a modulation order, a target code rate, and a spectral efficiency and selecting an MCS index associated with a spectral efficiency closest to and less than or equal to the estimated resource element efficiency;
calculate a transport block size (TBS) using the selected MCS index and associated modulation order and target code rate;
adjust the value of the calculated TBS based on a difference between the calculated TBS and the desired number of bits; and
transmit the set of information bits using the adjusted TBS.

13. The wireless transmitter of claim 12, wherein, to adjust the value of the calculated TBS, the processing circuitry is operable to:
determine the desired number of bits is less than or equal to the accumulated number of information bits minus CRC bits;
determine whether the calculated TBS is less than or greater than the desired number of bits;
upon determining the calculated TBS is less than the desired number of bits, increase the MCS index until an associated TBS is greater than or equal to the desired number of bits;
and upon determining the calculated TBS is greater than the desired number of bits, decrease the MCS index until an associated TBS reaches the smallest value that is greater than or equal to the desired number of bits.

14. The wireless transmitter of claim 12, wherein, to adjust the value of the calculated TBS, the processing circuitry is operable to:
determine the desired number of bits is less than or equal to the accumulated number of information bits minus CRC bits;
determine the calculated TBS is less than the desired number of bits;
increase the number of RBGs to use for transmission; and
estimate the resource element efficiency, determine the MCS, and calculate the TBS using the increased number of RBGs.

15. The wireless transmitter of claim 12, wherein, to adjust the value of the calculated TBS, the processing circuitry is operable to:

determine the desired number of bits is greater than the accumulated number of information bits minus the CRC bits;

determine whether the calculated TBS is less than or greater than the accumulated number of information bits minus the CRC bits;

upon determining the calculated TBS is less than the accumulated number of information bits minus the CRC bits, increase the MCS index until an associated TBS is greater than or equal to the accumulated number of information bits minus the CRC bits; and upon determining the calculated TBS is greater than the accumulated number of information bits minus the CRC bits, decrease the MCS index until an associated TBS reaches the smallest value that is greater than or equal to the accumulated number of information bits minus the CRC bits.

16. The wireless transmitter of claim 12, the processing circuitry further operable to determine that the adjusted TBS is between a minimum threshold size and a maximum threshold size.

17. The wireless transmitter of claim 12, the processing circuitry further operable to:

determine that the selected MCS index is higher than can be supported by the channel quality associated with the one or more RBGs;

receive a negative acknowledgement (NACK) for the transmitted set of information bits; and adjust an outer loop link adaptation parameter based on the determination that the selected MCS index is higher than the channel quality can support.

18. The wireless transmitter of claim 12, the processing circuitry further operable to:

determine that the selected MCS index is lower than can be supported by the channel quality associated with the one or more RBGs;

receive a positive acknowledgement (ACK) for the transmitted set of information bits;

and adjust an outer loop link adaptation parameter based on the determination that the selected MCS index is lower than the channel quality can support.

19. The wireless transmitter of claim 12, the processing circuitry further operable to:

determine that the selected MCS index is too high for the channel quality associated with the one or more RBGs; and not transmit the set of information bits.

20. The wireless transmitter of claim 12, the processing circuitry further operable to:

receive a negative acknowledgement (NACK) for the transmitted set of information bits;

determine a modulation type for a wireless retransmission that maximizes an amount of information bits per RBG based on a channel quality associated with the one or more RBGs and the modulation type;

determine a number of the one or more RBGs to use for retransmission by accumulating the maximum amount of information bits per RBG until the accumulated number of information bits is greater than or equal to the TBS plus CRC bits;

estimate a resource element efficiency for the retransmission by comparing the TBS pkus CRC bits and the determined number of RBGs for retransmission;

determine an MCS for the retransmission by using the table that associates an MCS index with a modulation order, a target code rate, and a spectral efficiency and selecting an MCS index associated with a spectral efficiency closest to and less than or equal to the estimated resource element efficiency;

determine a modulation order based on the selected MCS index; and retransmit the set of information bits using the determined modulation order and TBS.

21. The wireless transmitter of claim 12, wherein the wireless transmitter comprises a network node.

22. The wireless transmitter of claim 12, wherein the wireless transmitter comprises a wireless device.

23. A wireless transmitter (110, 120) of a wireless communication network, the wireless transmitter comprising an obtaining module, a determining module, and a transmitting module;

the obtaining module operable to obtain a set of information bits for wireless transmission using one or more radio resource block groups (RBGs), wherein the number of bits in the set of information bits is referred to as the desired number of bits;

the determining module operable to:

determine a modulation type for the wireless transmission that maximizes an amount of information bits per RBG based on a channel quality associated with the one or more RBGs and the modulation type;

estimate a total number of bits for transmission based on the desired number of bits, a number of cyclic redundancy check (CRC) bits, and a number of padding bits;

determine a number of the one or more RBGs to use for transmission by accumulating the maximum amount of information bits per RBG until the accumulated number of information bits is greater than or equal to the estimated total number of bits for transmission;

estimate a resource element efficiency by comparing the estimated total number of bits for transmission and the determined number of RBGs for transmission;

determine a modulation and coding scheme (MCS) by using a table that associates an MCS index with a modulation order, a target code rate, and a spectral efficiency and selecting an MCS index associated with a spectral efficiency closest to and less than or equal to the estimated resource element efficiency;

calculate a transport block size (TBS) using the selected MCS index and associated modulation order and target code rate;

adjust the value of the calculated TBS based on a difference between the calculated TBS and the desired number of bits; and the transmitting module operable to transmit the set of information bits using the adjusted TBS.

* * * * *